June 3, 1958
A. G. FOLLOWS
2,837,404
MANUFACTURE OF POTASSIUM BICARBONATE
AND POTASSIUM CARBONATE
Filed Sept. 4, 1956
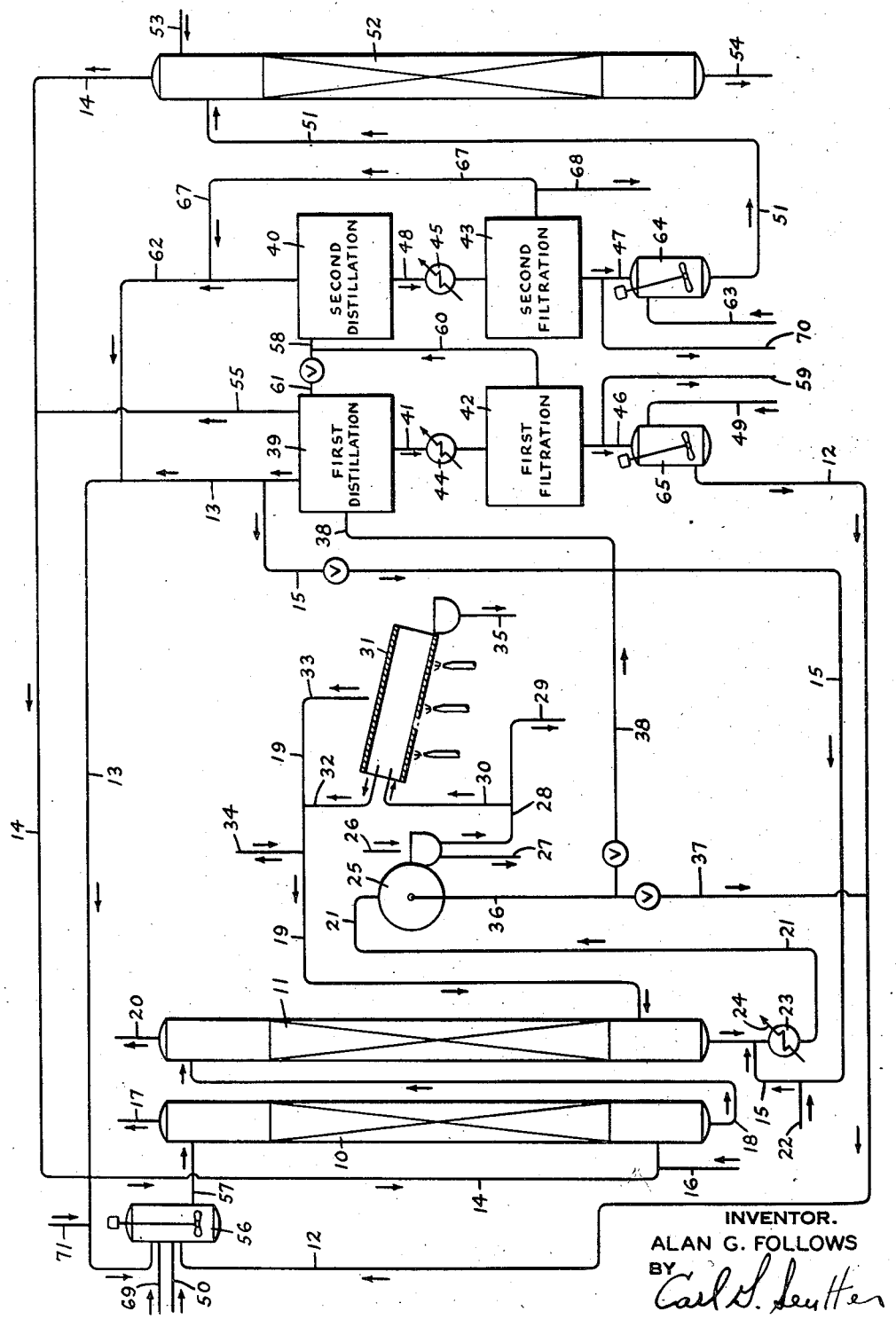
INVENTOR.
ALAN G. FOLLOWS
BY
ATTORNEY.

United States Patent Office 2,837,404
Patented June 3, 1958

2,837,404

MANUFACTURE OF POTASSIUM BICARBONATE AND POTASSIUM CARBONATE

Alan G. Follows, Camillus, N. Y., assignor to Allied Chemical & Dye Corporation, New York, N. Y., a corporation of New York Application September 4, 1956, Serial No. 607,964

20 Claims. (Cl. 23—63)

This invention relates to the manufacture of potassium bicarbonate and potassium carbonate from potassium chloride.

As is generally known to those skilled in the art, the ammonia-soda process for the manufacture of sodium bicarbonate and sodium carbonate from sodium chloride, has proven to be uniquely successful, to the extent that it has almost entirely displaced other processes, such as the Le Blanc process. In the ammonia-soda process, an aqueous solution of sodium chloride is contacted with ammonia and carbon dioxide to produce sodium bicarbonate, according to the following reaction:

$$NaCl + NH_3 + CO_2 + H_2O \underset{aq.}{\rightleftarrows} NaHCO_3 + NH_4Cl \quad (1)$$

Sodium bicarbonate is readily separated from the resulting aqueous solution and, if desired, it may be calcined to produce sodium carbonate.

It is a generally acknowledged fact that in substantially all of its chemical reactions, potassium functions substantially the same as sodium. It would thus seem that potassium bicarbonate could be made according to reaction (1) by the simple expedient of substituting potassium chloride for sodium chloride. This has been tried and found to be notoriously unsuccessful. That this is true may be observed from the fact that the bulk of the potassium carbonate manufactured today is produced by carbonating potassium hydroxide, which latter compound is comparatively expensive by virtue of its electrolytic preparation from potassium chloride.

Apparently the basic reason behind the difference between potassium and sodium in this reaction lies in the fact that whereas the solubility relationships are favorable in reaction (1), the sodium process, they are not favorable in reaction (2):

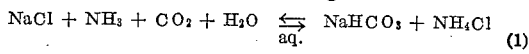
$$KCl + NH_3 + CO_2 + H_2O \underset{aq.}{\rightleftarrows} KHCO_3 + NH_4Cl \quad (2)$$

The systems which result from the carbonation and ammoniation of potassium chloride or sodium chloride may be considered as comprising the chlorides and bicarbonates of ammonium and potassium or sodium. The reactions may then be briefly represented, and are often referred to as involving the reversible double decomposition of the corresponding alkali metal chloride and ammonium bicarbonate, viz:

$$NaCl + NH_4HCO_3 \underset{aq.}{\rightleftarrows} NaHCO_3 + NH_4Cl \quad (3)$$

$$KCl + NH_4HCO_3 \underset{aq.}{\rightleftarrows} KHCO_3 + NH_4Cl \quad (4)$$

The reaction proceeds under conditions of concentration and temperature which selectively precipitate the least soluble salt of the reaction liquor or system and in the direction occupied by that salt. In reaction (3) the solubility in water of the sodium bicarbonate is less than that of the other three compounds, and accordingly it is easily recoverable as a precipitate. In the potassium system (4), the potassium bicarbonate does not precipitate in economically feasible yield and purity with respect to ammonium bicarbonate because of the relatively high solubility of the former.

Many attempts have been made to eliminate this difficulty but apparently to no avail. Whereas alternative processes have been advanced, there is today no commercially workable potassium process analogous to the ammonia-soda process. The alternative processes have proven to be defective, inadequate, or undesirable in that they are characterized by one or more of the following: undesirable high pressures, high temperatures, expensive raw materials, expensive or otherwise undesirable solvents or catalysts, long reaction times, complex reactions, low yields, and impure products.

One object of this invention is to provide a simple, inexpensive, easily operable, efficient, integrated process for the manufacture of potassium bicarbonate and potassium carbonate from potassium chloride.

A second object of this invention is to provide a new method of recovery of a prepared potassium bicarbonate and potassium carbonate, this method involving unique dilution and cooling operations.

A third object of this invention is to realize high efficiency of process by a novel integrated scheme of mother liquor recycle and recovery of solvent, salts, and ammonia.

A further object of this invention is to provide a system utilizing cheap raw materials, low temperatures and pressures, and short reaction times.

Further objects and advantages of this invention will be apparent from the following description:

According to this invention, the double decomposition or precipitation is effected within an aqueous medium containing, in addition to the components of the double decomposition reaction system of Equation 4, a suitable quantity of a free, basic, organic, nitrogen compound weaker in basic properties than ammonium hydroxide. This additional compound may be incorporated into the reaction liquor at any point prior to precipitation. Advantageously, however, it is incorporated into the reaction system so as to be present with the potassium chloride during introduction into it of one or both the gaseous reactants, or during addition thereto of ammonium carbonate or bicarbonate as the case may be. When so present during the preparation of the reaction liquor, the concentration of the nitrogen compound is preferably somewhat lower than that preferred for the later precipitation step; under these conditions, the preferred precipitation concentration is achieved by supplemental addition of nitrogen compound.

In practice of the invention, the aqueous liquor or solution containing potassium chloride and carbonate (including bicarbonate) and ammonium ions in relative proportions such as to precipitate a carbonate compound upon being cooled must contain at least about one part by volume of such organic nitrogen compound for each two parts by volume of water. Attempts to employ lower concentrations of the nitrogen compound have failed to produce satisfactory yields of precipitate containing acceptably low proportions of potassium chloride; often the potassium chloride content of such precipitates exceeds their potassium carbonate or bicarbonate content. In fact, it is preferred, in the interests of high yield of potassium carbonate and potassium bicarbonate and of ease of control of operation, that the quantity of the organic nitrogen compound present when precipitation takes place be at least about equal to the quantity of water.

The particular quantity of organic nitrogen compound used which will produce a solution yielding the optimum yield, purity, or both, of desired product will, however, vary, depending upon one or more of several factors, including the particular organic nitrogen compound selected, the relative proportions of potassium chloride and the other reactants present, the nature of the desired product (whether potassium carbonate or potassium bicarbonate), and the temperatures at which solution and precipitation are effected. In general, quite high concentrations, as up to 3 or 4 or more volumes of the compound per volume of water, may be used satisfactorily, without undue impairment of yield from the optimum, possibly but not in all instances with some sacrifice of quality of final product. In most instances, it is not necessary that the concentration of organic nitrogen compound in the solvent exceed above 60% by volume at the time of precipitation in order to achieve good results in terms of both yield and quality.

Mother liquor containing the organic nitrogen compound, after precipitation and separation of the desired potassium compound, may be returned for reuse directly as the reaction liquor. When this is done, a relatively high precipitation temperature is preferred in the interest of purity of product.

Weak nitrogenous organic compounds used in practice of the invention include representatives of the classes of amides and amines which remain in the free state in the reaction liquor, i. e. in solutions which also contain ammonium carbonate or bicarbonate or their constituent ions. Such compounds are weaker in basic properties than ammonium hydroxide in equivalent concentration, and may be exemplified by dimethyl formamide, pyridine, N-methyl pyrrolidone-2 and N-($\beta$-ethanol)pyrrolidone-2. Throughout the system, such components remain in the free state and are recoverable as such or in mother liquor remaining after precipitation, for return, if desired, to the desired point or points in the system.

Several of the lower amines, e. g. methylamine or trimethylamine, are actually stronger in basic properties than ammonium hydroxide and are not embraced within the scope of this invention. In such a system, trimethylamine would react to form its carbonate or bicarbonate, whereas a compound such as dimethyl formamide, due to its lesser basicity, would remain in its free uncombined state in an ammoniated system containing carbon dioxide. In this invention, the compound at all stages is maintained as free amine or free amide, and is available in the free state in the mother liquor remaining after precipitation of potassium bicarbonate for reuse within the system.

According to one embodiment of this invention, both ammoniation and carbonation of potassium chloride are effected in the presence of the selected additional free, organic, nitrogen compound weaker in basic properties than ammonium hydroxide, to produce a reaction liquor or solution containing selectively precipitatable potassium bicarbonate. This solution, after dilution with additional nitrogen compound if desired, is cooled in one or more steps, and the bicarbonate is separated, to be calcined to potassium carbonate if desired. The mother liquor from the potassium bicarbonate precipitation may be thought of as containing the following components: nitrogen compound, water, unreacted potassium chloride, ammonium chloride produced with the potassium bicarbonate removed from the system, ammonia, and carbon dioxide. A portion of this mother liquor may be recycled to the ammoniation and carbonation operations and the remainder distilled in two steps either continuously or batchwise. In the first step ammonia and carbon dioxide are evolved, and a condensable overhead fraction is obtained which is rich in water and poor in nitrogen compound relative to the still contents. A crop of solids richer in potassium chloride than in ammonium chloride is salted out as a result of this distillation and is recovered by filtration. At least a portion of these solids is dissolved in water and recycled to the contacting step. Some of the filtrate is recycled to the first distillation step with the remainder being passed to the second salting-out distillation step in which is formed a crop of solids richer in ammonium chloride than in potassium chloride. This crop is filtered, washed, placed in solution in water, and limed to liberate ammonia which is recycled to the contacting step, the calcium chloride bottoms from the liming operation being passed out of the immediate system. The mother liquor from the second filtration step contains mainly nitrogen compound and after being separated from the precipitated ammonium chloride, it is recycled to the contacting step.

The foregoing embodiment and modifications of the process of the invention may be described in connection with the attached drawing which is a diagrammatic flow sheet.

In the drawing, reactors 10 and 11, separately shown, but which may be integral, represent absorption towers wherein may be contacted upwardly ascending gases and downwardly flowing liquid. Both towers contain internal packing or shower decks as is common in the art, and may alternatively contain bubble decks, the former being preferred because of the lower pressure drop.

In preferred practice, wet or anhydrous dimethyl formamide, depending on conditions hereinafter described, is admitted through line 13 to the mixing vessel 56 simultaneously with an aqueous solution of potassium chloride entering through line 12. Fresh charge solid potassium chloride also enters vessel 56 through line 69, and water is admitted thereto through line 58. Potassium chloride content of the aqueous potassium chloride solution is such as to yield a system after mixing which is essentially saturated with potassium chloride. As mixed in vessel 56, and passed to the top of tower 10 through line 57, the solution will advantageously contain at 35° C. about 6.9 grams of potassium chloride per 100 ml. of solvent and essentially equal amounts of water and dimethyl formamide. Under other conditions of operation, e. g. other temperatures or ratios of dimethyl formamide to water, the concentration of potassium chloride in the mixture will vary although in each case the solution will preferably but not necessarily be substantially saturated with potassium chloride. This solution is contacted in tower 10 with ammonia, entering near the bottom of the tower through line 14, for time sufficient under existing temperature and pressure to absorb one mol of ammonia for each mol of KCl present. A 10% excess of ammonia may advantageously be employed. This amount of ammonia is less than the amount required to saturate the solution. Make-up ammonia may be added to the system through line 16. Unabsorbed ammonia leaves the tower at 17 and passes to a recovery system not shown. The temperature in this tower 10, as well as in tower 11, may be controlled if desired by heat exchangers, advantageously spaced throughout the towers and preferably it is maintained between about 35° C. and 50° C. when the reaction is conducted at atmospheric pressure.

The ammonia solution is withdrawn from tower 10 and passed to tower 11 through line 18. Under certain conditions of operation, additional nitrogen compound may be added to line 18, although this will generally not be necessary. In tower 11, the solution is contacted with carbon dioxide admitted to the bottom of the tower through line 19, for time sufficient to absorb one mol of carbon dioxide for each mol of potassium chloride present. The reaction time (i. e. time of retention of solution in tower 11) is a function of the pressure and temperature and will generally be less than 30 minutes. A shorter retention time gives a high rate of throughput and also minimizes possible loss of solvent at this point. The pressure in towers 10 and 11 is substantially atmospheric; higher pressures may be employed with resulting higher throughput, and smaller solvent loss. At higher pressures, the maximum reaction temperature will be proportionately higher.

A 10% excess of carbon dioxide may advantageously be so added to the solution. Unabsorbed carbon dioxide is removed through line 20 to a recovery system not shown. Some KHCO₃ obtains immediately in the effluent which on cooling in a later step yields more potassium bicarbonate. The effluent is removed from tower 11 through line 21. The system at this time will generally be at 35° C., although it may be as high as 50° C.

If desired, potassium carbonate may be directly produced according to a slightly different embodiment of this process. Equation 5 indicates the method of formation:

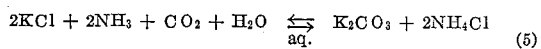

$$2KCl + 2NH_3 + CO_2 + H_2O \underset{aq.}{\rightleftarrows} K_2CO_3 + 2NH_4Cl \quad (5)$$

This reaction may be made to prevail by control of conditions in tower 11 so that one-half mol of carbon dioxide is present for each mol of KCl. In this modification the product formed would be substantially bicarbonate-free potassium carbonate.

Additional dimethyl formamide is preferably added from line 15 or 22 to the potassium bicarbonate-containing solution in line 21, the concentration of the effluent at this point being changed from 50% to 60% by volume of dimethyl formamide.

The dilution of the effluent as it leaves the reactor, as at line 21 in the drawing, from a dimethyl formamide concentration of 50% to 60%, has been found to raise the yield from about 50% to about 65% without significantly altering the purity of the product. Dilution to concentrations greater than 60% in this embodiment does not appear to improve the yield, but does markedly decrease the purity of the product, i. e., the percentage of potassium chloride in the product.

The following Table A shows the purity of product potash in terms of the percent of potassium chloride contained therein, as a function of the percent of dimethyl formamide in the final diluted volume when starting with a 50% solution of dimethyl formamide.

TABLE A

| Expt. DMF # | Final Vol. percent DMF | Yield | Calcined Solids | |
|---|---|---|---|---|
| | | | percent K₂CO₃ | percent KCl |
| 32 | 60 | 64.7 | 99.7 | 0.3 |
| 35 | 60 | 63.2 | 99.7 | 0.3 |
| 36 | 65 | 64.6 | 91.3 | 8.7 |
| 33 | 70 | 67.1 | 84.2 | 15.8 |
| 37 | 70 | 64.9 | 81.0 | 19.0 |
| 34 | 80 | 64.8 | 71.9 | 28.1 |

Thus it can be seen that dilutions to concentrations greater than 60% are not readily practicable without sacrifice of purity, i. e., the chloride content of the product potash. These greater dilutions may, however, be employed when a final product with greater chloride content is desired.

Alternatively, the entire amount of base may be added to the effluent from tower 11, at line 21 through line 15. Under this modification it will not be necessary to add base to tower 10 through line 13 nor will it be necessary to add additional base through line 22, except to compensate for loss in the system. The preferred procedure however is to add the bulk of the nitrogen compound to the solution within vessel 56, and to add only the desired incremental amount through line 15.

It is essential under any conditions to bring the desired amount of base into the system before the filtration operation and then preferably prior to cooling, in order that the potassium bicarbonate may be properly precipitated from the reaction liquor in good yield.

To effect precipitation of the potassium bicarbonate most advantageously, the effluent from tower 11 will be cooled in heat exchanger 23 by coolant or refrigerant in line 24. The ultimate temperature of cooling may be as low as 0° C., although it may be as high as 20° C.

The cooled effluent is filtered in filter 25, the residue, crude potassium bicarbonate, being washed with absolute methyl alcohol in lines 26 and 27 or alternatively with saturated aqueous potassium bicarbonate solution. The wash solution in either case is passed to a recovery system, not shown. Potassium bicarbonate may be recovered in high purity by cooling and filtering in two steps (not shown). The first filtration operation may be advantageously conducted at 20° C. to yield a product low in potassium chloride. The second filtration operation may be conducted at 0° C. to yield additional potassium bicarbonate, containing a somewhat greater amount of potassium chloride. The bicarbonates obtained will be separately treated. Recovered crude potassium bicarbonate, which may contain varying amounts of NH₄HCO₃ and KCl, is withdrawn from the filter 25 through line 28 and may be recovered as such by withdrawal through line 29.

To purify the crude potassium bicarbonate of ammonium carbonate or ammonium bicarbonate which it may contain, it may be mildly heated, the ammonium salts being decomposed and driven off. Thus may be produced pure potassium bicarbonate. Where the desired ultimate product is potassium carbonate with potassium bicarbonate as an intermediate product, this will not be separately done.

For conversion to potassium carbonate, the crude bicarbonate is passed through line 30 to fired calciner 31 wherein it may be heated to produce that product. Where potassium carbonate is directly produced as hereinbefore described, only mild heating will be required to remove therefrom any water and ammonium carbonate or bicarbonate present therein.

By-product carbon dioxide (containing water and ammonia) may be removed at line 32 and after being passed to an intermediate storage, be returned to tower 11 through line 19. Ammonia liberated in kiln 31 may be separately recovered, or it may be passed directly to tower 11. If separately recovered (not shown), it will be combined with the ammonia in line 14. The products of combustion may also be passed through line 33 in similar fashion to be ultimately returned to tower 11. Through line 34, make-up carbon dioxide may be added, or as is more likely, excess carbon dioxide may be removed. Pure potassium carbonate is withdrawn from the system at 35.

The mother liquor from filter 25 is removed through line 36, and a portion thereof may be recycled to vessel 56 through lines 37 and 12. If mother liquor is recycled at all, the net recycle rate will be such that an aliquot thereof will be recycled not more than once. The other portion of the mother liquor is passed through line 38 to the distillation-recovery system which is shown only schematically to indicate the process steps involved.

The recovery of dimethyl formamide is facilitated by virtue of the fact that at no point in the system is it found as a salt, but only as the free compound. The mother liquor comprising dimethyl formamide, water, unreacted potassium chloride, ammonium chloride (produced with the potassium bicarbonate removed from the system), ammonium hydroxide and carbon dioxide, is treated to recover these components in a distillation recovery system, the first step of which is schematically indicated by box 39. Here the mother liquor is subjected to a salting-out distillation, which may be performed either continuously or batchwise, to produce in line 55 a non-condensable overhead containing ammonia and carbon dioxide. These gases are withdrawn through line 14 and recycled to reactor 10. The condensable overhead from the salting-out distillation step 39, which is rich in water and poor in dimethyl formamide relative to the still contents, may be recycled from step 39 through line 13 to vessel 56, or it may be further concentrated, as is more desirable in the case of the portion recycled through line 15 to line 21. Make-up dimethyl formamide may be added through line 71 to line 13 as needed.

The first step 39 of the salting-out distillation is only continued to the extent necessary to facilitate recovery of potassium chloride. This distillation may be advantageously conducted under vacuum e. g. 150 mm. Hg, at which pressure the liquid has a relatively low boiling point, which will vary as the distillation proceeds if the operation is conducted batchwise. This low temperature tends to minimize loss through hydrolysis of the dimethyl formamide. During the evaporation, bottoms are continuous or periodically removed from distillation operation 39 through line 41, and may be cooled in heat exchanger 44 before being passed to the first filtration step 42. Here the slurry is filtered to yield crystals of potassium chloride (containing only a small amount of ammonium chloride, preferably less than 10%). These potassium chloride crystals may be withdrawn from line 46 through line 59 to be marketed as such, or they may be passed through line 46 to vessel 65 wherein they may be dissolved in water admitted through line 49 and recycled through line 12 to vessel 56. Preferably at least a portion of these crystals will be removed through line 59. In vessel 56 recycled potassium chloride is mixed with fresh charge potassium chloride from line 69 and water from line 50.

The salting-out in first distillation step 39 is conducted to obtain a minimum amount of ammonium chloride in the potassium chloride crystals, since any ammonium chloride in the feed to reactor 10 tends to increase the chloride content and to lower the yield of the product potassium bicarbonate. Where a product is desired containing higher amounts of chloride, greater amounts of ammonium chloride will be recycled with the potassium chloride.

A portion of the filtrate from first filtration step 42 may be recycled through lines 60 and 61 to distillation step 39, to control the purity and amount of the precipitated potassium chloride. A second portion of this filtrate is passed from line 60 through line 58 to second distillation step 40. Here the distillation is controlled to obtain salting-out of ammonium chloride containing only small amounts of potassium chloride. The slurry from this step 40 may be passed through line 48 and cooler 45 to the second filtration step 43. The filtrate therefrom containing mainly dimethyl formamide, is passed therefrom through lines 67, 62, and 13 to mixed vessel 56. Draw-off line 68 is provided to remove filtrate from the system as desired. The dimethyl formamide from filtration step 43 contains substantially little or no water and it may desirably be passed directly to the dilution point in line 21, rather than to vessel 56 as shown, since the dimethyl formamide in lines 62 and 13 may contain somewhat greater amounts of water as hereinbefore set forth, depending upon the conditions of operation in distillation steps 39 and 40.

Crystalline ammonium chloride, containing some potassium chloride, may be washed to recover dimethyl formamide and then withdrawn from line 47 through line 70 to be sold as by-product or it may be passed directly to mixing vessel 64. Here it is dissolved in water from line 63 and passed through line 51 to liming tower 52 wherein it is contacted with milk of lime from line 53. Ammonia overhead is removed through line 14 and recycled to tower 10. The bottoms from tower 52 contain mainly calcium chloride with small amounts of potassium chloride. The reaction occurring in tower 52 is:

$$Ca(OH)_2 + 2NH_4Cl \rightarrow 2NH_3\uparrow + CaCl_2 + 2H_2O \quad (6)$$

The above detailed description sets forth the results of a complete integrated process for operation with dimethyl formamide. Free, basic, organic, nitrogen compounds weaker in basic properties than ammonium hydroxide other than dimethyl formamide may be used in practice of this invention. Preferred among such other compounds are those selected from the group consisting of pyridine, N-methyl pyrrolidone-2 and N-($\beta$-ethanol) pyrrolidone-2. In the following examples typical results of use of these three compounds are indicated.

*Example I.—Pyridine*

7.3 g. potassium chloride was added to a mixture of 50 ml. of pyridine and 50 ml. of water at 35° C. To this unsaturated solution was added 11.6 g. of ammonium bicarbonate (50% excess) and the resultant solution was cooled to 1.5° C. and filtered. 99.5 ml. of homogeneous filtrate was obtained. After methanol washing, and air drying, the 9.2 g. (36.1% yield) of residual crude product was analyzed. It contained 38.4% potassium bicarbonate, 61.6% ammonium bicarbonate, and 0.0% potassium chloride. Upon calcination 100% pure, chloride-free, potassium carbonate was produced.

*Example II.—N-methyl pyrrolidone-2*

5.6 g. potassium chloride was added to a mixture of 50 ml. of N-methyl pyrrolidone-2 and 50 ml. of water at 35° C. 8.9 g. (50% excess) of ammonium bicarbonate was added and the solution cooled to 0° C. and filtered. The filter cake was washed with methanol and air dried. 7.7 g. of crude product contained 46.1% potassium bicarbonate, 53.9% of ammonium bicarbonate, and 0.0% potassium chloride. Calcination yielded 100% pure potassium carbonate in 47.3% yield.

*Example III.—N-($\beta$-ethanol)-pyrrolidone-2*

20 g. potassium chloride was added to a mixture of 50 ml. of N-($\beta$-ethanol)pyrrolidone-2 and 100 ml. of water at 35° C. 31.8 g. (50% excess) of ammonium bicarbonate was added and the solution cooled to 0° C. and filtered. The filter cake was washed with methanol and air dried. 24.4 g. of product contained 27.0% potassium bicarbonate, 0.0% potassium chloride, and 73.0% ammonium bicarbonate. Upon calcination, 100% pure potassium bicarbonate was produced in 24.1% yield.

It is noteworthy that in each of the above examples the potassium bicarbonate product is completely free of potassium chloride. These examples also demonstrate that in practice of the invention ammonium bicarbonate may be employed in place of gaseous ammonia and carbon dioxide. As noted in connection with the use of dimethyl formamide, the organic compounds of Examples I, II, and III may be added in two steps, the second step being dilution of reactor effluent, preferably to not above about 60% content of the added compound.

Practice of the invention provides for production of potassium carbonate or bicarbonate, as the case may be, of grades or purity capable of meeting even the most exacting needs for commercial product or use and in yields which are economically attractive. With internal recycling of properly recovered process streams such as mother liquor and unreacted potassium chloride, 99% and higher purity potassium bicarbonate may be recovered in yield as high as about 65% of theoretical based on potassium chloride.

The nitrogen compounds whose use characterizes the invention permit obtention of these advantageous results without themselves undergoing chemical or other changes necessitating unduly costly or complex procedure for their reuse within the system including, when desired, their substantial isolation from other components of the system. Such reuse is accompanied with substantially no loss except such small losses as may occur from time to time for mechanical reasons or because of hydrolysis of the nitrogen compound. Hydrolysis of the preferred compounds is slight and economically attractive under the specified conditions of operation.

It will be understood by persons skilled in the art that certain aspects of the present invention may be practiced successfully whether the ammoniation and carbonation of potassium chloride solution be effected by means of gaseous ammonia followed by carbon dioxide, or by means of ammonium carbonate or bicarbonate, and that with respect to such aspects the terms "ammoniation" and "carbonation" as used in the appended claims are intended to include all such methods of producing ammonium and carbonate or bicarbonate ions in the reaction liquor.

It will also be understood by such persons that, although it is preferred to operate with starting solutions which are saturated or nearly so with potassium chloride and to employ ammonia or ammonium carbonate or bicarbonate in stoichiometric excess thereover, use of these conditions is not essential to practice of the invention. Any concentration of potassium chloride may be used which, after being reasonably completely carbonated and ammoniated, will, upon cooling, yield a carbonate compound precipitate within the reaction liquor containing the selected free, basic, organic nitrogen compound weaker in basic properties than ammonium hydroxide.

The present application is a continuation-in-part of my copending application Serial No. 395,175, filed November 30, 1953, now abandoned.

I claim:

1. The method of producing a potassium salt selected from the group consisting of potassium carbonate and potassium bicarbonate comprising forming an ammoniated and carbonated aqueous solution containing potassium chloride and carbonate and ammonium ions in relative proportions and in concentration such that the solution upon cooling precipitates a carbonate compound, including within said solution for each two parts of water at least about one part of a free, basic, organic nitrogen compound weaker in basic properties than ammonium hydroxide, cooling said solution until precipitate comprising one of the potassium salts selected from the group consisting of potassium carbonate and potassium bicarbonate forms, and separating mother liquor containing said organic nitrogen compound from said precipitate.

2. The method of producing potassium bicarbonate comprising forming a solution capable of precipitating carbonate compound upon being cooled composed of water and for each two parts of said water at least about one part of a free, basic, organic nitrogen compound weaker in basic properties than ammonium hydroxide as solvent and as solute potassium chloride and ammonium ions and bicarbonate ions in molar amount at least equal to the molar quantity of potassium chloride, cooling said solution to produce precipitate of bicarbonate salt, and recovering potassium bicarbonate containing crystals from the cooled solution.

3. The method of producing potassium carbonate comprising forming a solution capable of precipitating carbonate compound upon being cooled composed of water and for each two parts of said water at least about one part of a free, basic, organic nitrogen compound weaker in basic properties than ammonium hydroxide as solvent and as solute potassium chloride, ammonium ions, and carbonate ions, the carbonate ions being in molar quantity equal to more than one-half of but less than the molar quantity of potassium chloride, cooling said solution to produce precipitate of carbonate salt, and recovering potassium carbonate containing crystals from the cooled solution.

4. The method of producing a potassium salt selected from the group consisting of potassium carbonate and potassium bicarbonate comprising dissolving, in solvent composed of water and for each two parts of said water at least about one part of a free, basic, organic nitrogen compound weaker in basic properties than ammonium hydroxide, potassium chloride and ammoniating and carbonating agent in relative proportion and quantity to form a solution which upon cooling precipitates a carbonate compound, adding to said solution a further quantity of free, basic, organic nitrogen compound weaker in basic properties than ammonium hydroxide, and thereafter cooling said solution to precipitate therefrom one of the potassium salts selected from the group consisting of potassium carbonate and potassium bicarbonate.

5. The method of producing a potassium salt selected from the group consisting of potassium carbonate and potassium bicarbonate comprising forming an ammoniated and carbonated aqueous solution containing potassium chloride in quantity sufficient to substantially saturate said solution, and carbonate and ammonium ions in relative proportions and in concentration such that the solution upon cooling precipitates a carbonate compound, including within said solution for each part of water at least about one part of a free, basic, organic nitrogen compound weaker in basic properties than ammonium hydroxide, cooling said solution until precipitate comprising one of the potassium salts selected from the group consisting of potassium carbonate and potassium bicarbonate forms, and separating mother liquor containing said organic nitrogen compound from said precipitate.

6. The method of producing a potassium salt selected from the group consisting of potassium carbonate and potassium bicarbonate comprising forming an ammoniated and carbonated aqueous solution containing potassium chloride and carbonate and ammonium ions in relative proportions and in concentration such that the solution upon cooling precipitates a carbonate compound, including within said solution for each two parts of water at least about one part of an organic nitrogen compound selected from the group consisting of dimethyl formamide, pyridine, N-methyl pyrrolidone-2 and N-($\beta$-ethanol)pyrrolidone-2, and cooling said solution until a precipitate comprising one of the potassium salts selected from the group consisting of potassium carbonate and potassium bicarbonate is formed.

7. The method of producing a potassium salt selected from the group consisting of potassium carbonate and potassium bicarbonate comprising forming a solution capable upon cooling of forming as precipitate a carbonate compound, by dissolving potassium chloride in an aqueous solvent composed of at least one part of a free, basic, organic nitrogen compound of weaker basic properties than ammonium hydroxide for each two parts of water and by ammoniating and carbonating the resulting solution, cooling said solution until a precipitate comprising one of the potassium salts selected from the group consisting of potassium carbonate and potassium bicarbonate is formed, separating mother liquor containing said organic nitrogen compound from said precipitate, separating said last named compound from said mother liquor, and utilizing the separated compound with additional water as solvent for further quantities of potassium chloride.

8. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of at least one part of a compound selected from the group consisting of dimethyl formamide, pyridine, N-methyl pyrrolidone-2 and N-($\beta$-ethanol)pyrrolidone-2 for each part of water, ammoniating and carbonating the solution of potassium chloride, and thereafter cooling the solution until a precipitate comprising one of the potassium salts selected from the group consisting of potassium carbonate and potassium bicarbonate is formed.

9. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of at least about one part of a free, basic, organic nitrogen compound of weaker basic properties than ammonium hydroxide for each part of water, and by ammoniating and carbonating the solution of potassium chloride, and cooling said solution until a precipitate comprising one of the potassium salts selected from the group consisting of potassium carbonate and potassium bicarbonate is formed.

10. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of at least one part of dimethyl formamide for each part of water and by ammoniating and carbonating the solution of potassium chloride, and thereafter cooling the solution until a precipitate comprising one of the potassium salts selected from the group consisting of potassium carbonate and potassium bicarbonate is formed.

11. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of at least one part of pyridine in each part of water and by ammoniating and carbonating the solution of potassium chloride and thereafter cooling the solution until a precipitate comprising one of the potassium salts selected from the group consisting of potassium carbonate and potassium bicarbonate is formed.

12. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of at least one part of N-methyl pyrrolidone-2 for each part of water and by ammoniating and carbonating the resulting solution, and thereafter cooling said solution until a precipitate comprising one of the potassium salts selected from the group consisting of potassium carbonate and potassium bicarbonate is formed.

13. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of at least one part of N-($\beta$-ethanol) pyrrolidone-2 for each part of water and by ammoniating and carbonating the resulting solution, and thereafter cooling said solution until a precipitate comprising one of the potassium salts selected from the group consisting of potassium carbonate and potassium bicarbonate is formed.

14. Process according to claim 8 wherein the solution contains carbonating agent in molar quantity at least equal to its potassium chloride content and the precipitate formed comprises potassium bicarbonate.

15. Process according to claim 8 wherein the solution contains carbonating agent in molar quantity equal to at least half but not in excess of its potassium chloride content, and the precipitate comprises potassium carbonate.

16. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of about one part of dimethyl formamide for each part of water and by ammoniating and carbonating the resulting solution, adding dimethyl formamide to said solution to increase the concentration thereof in the solvent to not above about 60%, and cooling said solution until a precipitate comprising one of the potassium salts selected from the group consisting of potassium carbonate and potassium bicarbonate is formed.

17. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of about one part of pyridine for each part of water and by ammoniating and carbonating the resulting solution, adding pyridine to said solution to increase the concentration thereof in the solvent to not above about 60%, and cooling said solution until a precipitate comprising one of the potassium salts selected from the group consisting of potassium carbonate and potassium bicarbonate is formed.

18. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of about one part of dimethyl formamide for each part of water and by ammoniating and carbonating the resulting solution, adding dimethyl formamide to said solution to increase the concentration thereof in the solvent to not above about 60%, and cooling said solution until a precipitate comprising one of the potassium salts selected from the group consisting of potassium carbonate and potassium bicarbonate is formed.

19. The method of producing a potassium salt selected from the group consisting of potassium carbonate and potassium bicarbonate comprising forming a solution capable upon cooling of forming a carbonate compound precipitate by dissolving potassium chloride in an aqueous solvent composed of about one part of N-($\beta$-ethanol)-pyrrolidone-2 for each part of water and by ammoniating and carbonating the resulting solution, adding N-($\beta$-ethanol)pyrrolidone-2 to said solution to increase the concentration thereof in the solvent to not above about 60%, and cooling said solution until a precipitate comprising one of the potassium salts selected from the group consisting of potassium carbonate and potassium bicarbonate is formed.

20. The method of producing a potassium salt selected from the group consisting of potassium carbonate and potassium bicarbonate comprising forming an ammoniated and carbonated aqueous solution containing potassium chloride and carbonate and ammonium ions in relative proportions and in concentration such that the solution upon cooling precipitates a carbonate compound, including within said solution for each two parts of water at least about one part of a free, basic, organic nitrogen compound weaker in basic properties than ammonium hydroxide, cooling said solution until precipitate is formed comprising one of the potassium salts selected from the group consisting of potassium carbonate and potassium bicarbonate and an ammonium carbonate within an ammoniated and carbonated mother liquor containing the said organic nitrogen compound, water and unreacted potassium chloride, separating said precipitate from said mother liquor and heating the precipitate to decompose the said ammonium carbonate, distilling said mother liquor under vacuum to produce an uncondensable fraction comprising ammonia and carbon dioxide, a distillate comprising said organic nitrogen compound, and as residue an aqueous slurry comprising potassium chloride, and reusing nitrogen compound distilled from mother liquor with additional water for formation of additional solution of potassium chloride, and ammonium and carbonate ions.

References Cited in the file of this patent

UNITED STATES PATENTS 2,768,060    Follows    Oct. 23, 1956